(12) United States Patent
Van De Sluis

(10) Patent No.: US 7,904,503 B2
(45) Date of Patent: Mar. 8, 2011

(54) METHOD OF ENHANCING RENDERING OF CONTENT ITEM, CLIENT SYSTEM AND SERVER SYSTEM

(75) Inventor: Bartel Marinus Van De Sluis, Eindhoven (NL)

(73) Assignee: Gracenote, Inc., Emeryville, CA (US)

( * ) Notice: Subject to any disclaimer, the term of this patent is extended or adjusted under 35 U.S.C. 154(b) by 717 days.

(21) Appl. No.: 09/933,845

(22) Filed: Aug. 21, 2001

(65) Prior Publication Data

US 2002/0072989 A1    Jun. 13, 2002

(30) Foreign Application Priority Data

Aug. 23, 2000 (EP) .................................... 00202947

(51) Int. Cl.
*G06F 15/16* (2006.01)
(52) U.S. Cl. ........................ 709/203; 709/219
(58) Field of Classification Search .......... 709/201–203, 709/217–234; 705/14, 10
See application file for complete search history.

(56) References Cited

U.S. PATENT DOCUMENTS

| | | |
|---|---|---|
| 4,030,119 A | 6/1977 | Ellis |
| 4,397,011 A | 8/1983 | Ogawa |
| 4,491,882 A | 1/1985 | Fujiie |
| 4,587,643 A | 5/1986 | Monen et al. |
| 4,599,644 A | 7/1986 | Fischer |
| 4,641,205 A | 2/1987 | Beyers |
| 4,646,145 A | 2/1987 | Percy et al. |
| 4,675,757 A | 6/1987 | Block |
| 4,677,466 A | 6/1987 | Lert, Jr. et al. |
| 4,857,899 A | 8/1989 | Ishii |
| 4,870,613 A | 9/1989 | Clinkenbeard et al. |
| 4,893,193 A | 1/1990 | Nakamura et al. |
| 4,893,199 A | 1/1990 | Okada |
| 4,992,706 A | 2/1991 | Troemel et al. |
| 5,019,899 A | 5/1991 | Boles et al. |
| 5,113,383 A | 5/1992 | Amemiya et al. |

(Continued)

FOREIGN PATENT DOCUMENTS

DE    4309957    7/1994

(Continued)

OTHER PUBLICATIONS

Geoffrey B. Rhoads et al., Digimarc Corp., "Managing On-Line Media Library Through Links in Media Signals", U.S. Appl. No. 60/178,028.

(Continued)

*Primary Examiner* — Yasin Barqadle
(74) *Attorney, Agent, or Firm* — Schwegman, Lundberg & Woessner, P.A.

(57) ABSTRACT

A client system (200, 220) receives a content item. The user can mark the received content item as being of interest. In response to said marking, tracking means (204, 224) automatically provide identifying data for the marked content item to a remote server system (250). The server receives a portion of the content item from a client system (200, 220), processes the received portion to obtain an identifier for the content item, obtains further information on the content item using the identifier, and transmits the further information back to the client system (200, 220). The tracking means (204, 224) subsequently receive further information on the content item from the remote server system (250). An identifier for the content item can be used in an e-commerce system (160), for example by putting it on a shopping list (161) or to obtain a list of related items.

23 Claims, 2 Drawing Sheets

U.S. PATENT DOCUMENTS

Figure 1:
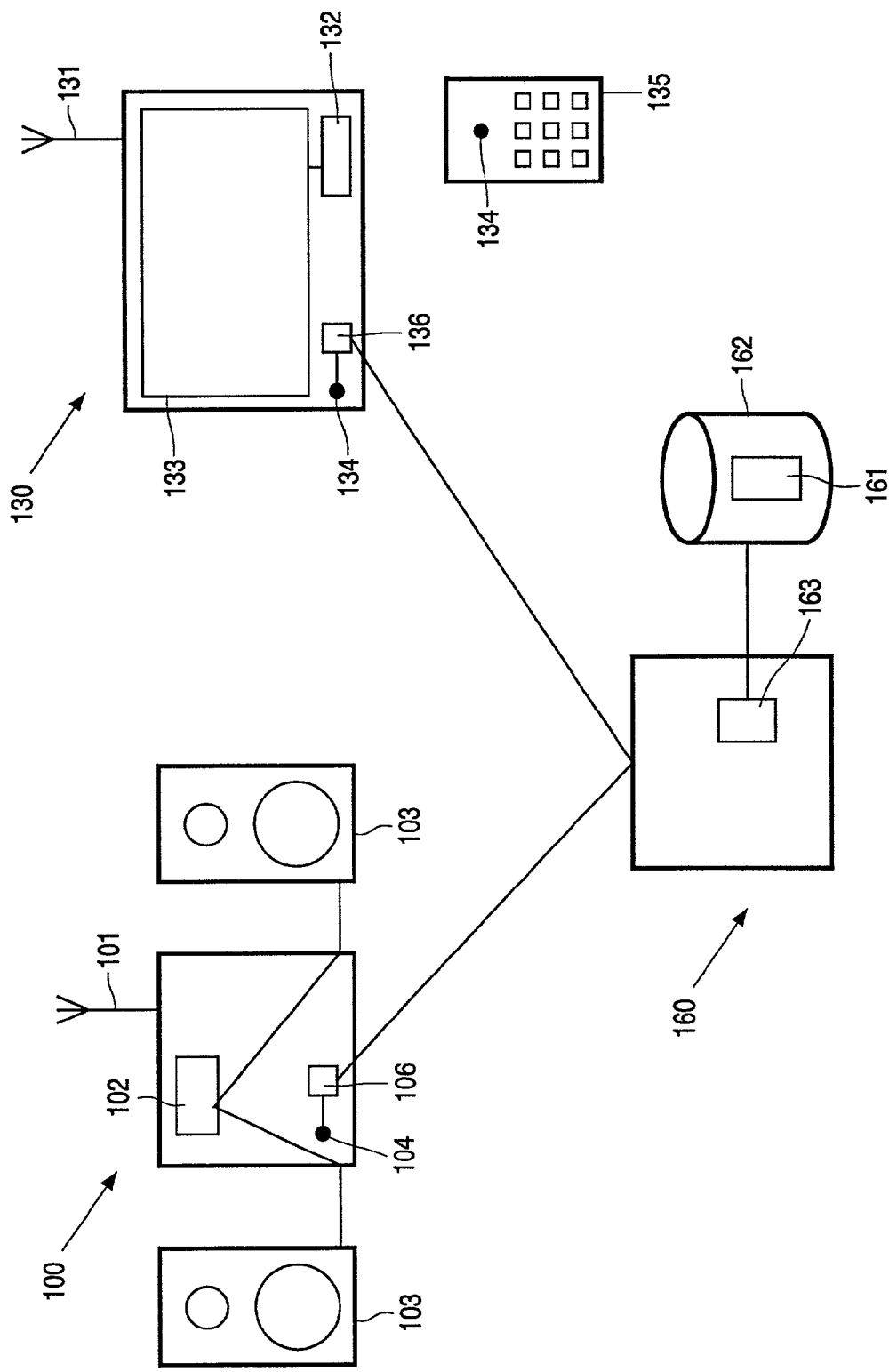

| | | | |
|---|---|---|---|
| 5,157,614 A | 10/1992 | Kashiwazaki et al. | |
| 5,157,646 A | 10/1992 | Amemiya et al. | |
| 5,220,567 A | 6/1993 | Dooley et al. | |
| 5,243,588 A | 9/1993 | Maeda | |
| 5,263,010 A | 11/1993 | Amemiya et al. | |
| 5,276,629 A | 1/1994 | Reynolds | |
| 5,341,350 A | 8/1994 | Frank et al. | |
| 5,392,264 A | 2/1995 | Hira | |
| 5,400,261 A | 3/1995 | Reynolds | |
| 5,404,393 A | 4/1995 | Remillard | |
| 5,414,684 A | 5/1995 | Nonaka et al. | |
| 5,430,698 A | 7/1995 | Nonaka et al. | |
| 5,436,653 A | 7/1995 | Ellis et al. | |
| 5,446,714 A | 8/1995 | Yoshio et al. | |
| 5,446,891 A | 8/1995 | Kaplan et al. | |
| 5,450,597 A | 9/1995 | Klappert et al. | |
| 5,463,605 A | 10/1995 | Nishida et al. | |
| 5,464,946 A | 11/1995 | Lewis | |
| 5,465,240 A | 11/1995 | Mankovitz | |
| 5,471,576 A | 11/1995 | Yee | |
| 5,475,835 A | 12/1995 | Hickey | |
| 5,499,294 A | 3/1996 | Friedman | |
| 5,519,435 A | 5/1996 | Anderson | |
| 5,544,139 A | 8/1996 | Aramaki et al. | |
| 5,559,949 A | 9/1996 | Reimber et al. | |
| 5,583,560 A | 12/1996 | Florin et al. | |
| 5,584,025 A | 12/1996 | Keithley et al. | |
| 5,612,729 A | 3/1997 | Ellis et al. | |
| 5,615,345 A | 3/1997 | Wanger | |
| 5,616,876 A | 4/1997 | Cluts | |
| 5,621,454 A | 4/1997 | Ellis et al. | |
| 5,625,608 A | 4/1997 | Grewe et al. | |
| 5,649,114 A | 7/1997 | Deaton et al. | |
| 5,679,911 A | 10/1997 | Moriyama et al. | |
| 5,680,379 A | 10/1997 | Ishida et al. | |
| 5,689,484 A | 11/1997 | Hirasawa | |
| 5,691,964 A | 11/1997 | Niederlein et al. | |
| 5,694,162 A | 12/1997 | Freeny, Jr. | |
| 5,694,546 A | 12/1997 | Reisman | |
| 5,701,385 A | 12/1997 | Katsuyama et al. | |
| 5,703,795 A | 12/1997 | Mankovitz | |
| 5,710,884 A | 1/1998 | Dedrick | |
| 5,721,827 A | 2/1998 | Logan et al. | |
| 5,726,957 A | 3/1998 | Hisamatsu et al. | |
| 5,740,304 A | 4/1998 | Katsuyama et al. | |
| 5,740,549 A | 4/1998 | Reilly et al. | |
| 5,745,681 A | 4/1998 | Levine et al. | |
| 5,751,672 A | 5/1998 | Yankowski | |
| 5,754,784 A | 5/1998 | Garland et al. | |
| 5,757,739 A | 5/1998 | Heath et al. | |
| 5,761,606 A | 6/1998 | Wolzien et al. | |
| 5,767,893 A | 6/1998 | Chen et al. | |
| 5,768,222 A | 6/1998 | Hisamatsu et al. | |
| 5,774,431 A | 6/1998 | Bos et al. | |
| 5,774,664 A | 6/1998 | Hidary et al. | 395/200.48 |
| 5,774,666 A | 6/1998 | Portuesi | |
| 5,778,181 A | 7/1998 | Hidary et al. | |
| 5,778,187 A | 7/1998 | Monteiro et al. | |
| 5,781,889 A | 7/1998 | Martin et al. | |
| 5,781,909 A | 7/1998 | Logan et al. | |
| 5,782,692 A | 7/1998 | Stelovsky | |
| 5,790,793 A | 8/1998 | Higley | 395/200.48 |
| 5,793,726 A | 8/1998 | Nagano | |
| 5,793,980 A | 8/1998 | Glaser et al. | |
| 5,796,393 A | 8/1998 | MacNaughton et al. | |
| 5,796,945 A | 8/1998 | Tarabella | |
| 5,796,952 A | 8/1998 | Davis et al. | |
| 5,809,512 A | 9/1998 | Kato | |
| 5,815,471 A | 9/1998 | Mince et al. | |
| 5,822,216 A | 10/1998 | Satchell, Jr. et al. | |
| 5,822,283 A | 10/1998 | Bos et al. | |
| 5,822,436 A | 10/1998 | Rhoads | |
| 5,826,267 A | 10/1998 | McMillan | |
| 5,848,427 A | 12/1998 | Hyodo | |
| 5,862,223 A | 1/1999 | Walker et al. | |
| 5,867,457 A | 2/1999 | Parvulescu et al. | |
| 5,893,910 A | 4/1999 | Martineau et al. | |
| 5,894,554 A | 4/1999 | Lowery et al. | |
| 5,903,816 A | 5/1999 | Broadwin et al. | |
| 5,905,248 A | 5/1999 | Russell | |
| 5,905,537 A | 5/1999 | Van Gestel | |
| 5,905,865 A | 5/1999 | Palmer et al. | |
| 5,907,793 A | 5/1999 | Reams | 455/3.1 |
| 5,915,091 A | 6/1999 | Ludwig et al. | |
| 5,915,288 A | 6/1999 | Gabriel | |
| 5,918,223 A | 6/1999 | Blum et al. | |
| 5,925,843 A | 7/1999 | Miller et al. | |
| 5,929,849 A | 7/1999 | Kikinis | |
| 5,949,411 A | 9/1999 | Doerr et al. | |
| 5,950,173 A | 9/1999 | Perkowski | |
| 5,953,005 A | 9/1999 | Liu | |
| 5,959,945 A | 9/1999 | Kleiman | |
| 5,960,081 A | 9/1999 | Vynne et al. | |
| 5,960,411 A | 9/1999 | Hartman et al. | 705/26 |
| 5,963,916 A | 10/1999 | Kaplan | |
| 5,987,525 A | 11/1999 | Roberts et al. | |
| 5,991,798 A | 11/1999 | Ozaki et al. | |
| 5,996,000 A | 11/1999 | Shuster | |
| 5,999,637 A | 12/1999 | Toyoda et al. | |
| 6,009,410 A | 12/1999 | LeMole et al. | |
| 6,011,758 A | 1/2000 | Dockes et al. | |
| 6,012,112 A | 1/2000 | Brase et al. | |
| 6,018,768 A | 1/2000 | Ullman et al. | |
| 6,025,837 A | 2/2000 | Matthews, III et al. | |
| 6,029,142 A | 2/2000 | Hill | |
| 6,031,795 A | 2/2000 | Wehmeyer | |
| 6,032,130 A | 2/2000 | Alloul | |
| 6,034,925 A | 3/2000 | Wehmeyer | |
| 6,035,329 A | 3/2000 | Mages et al. | |
| 6,061,306 A | 5/2000 | Buchheim et al. | |
| 6,061,680 A | 5/2000 | Scherf et al. | |
| 6,076,104 A | 6/2000 | McCue | 709/219 |
| 6,076,111 A | 6/2000 | Chiu et al. | |
| 6,078,301 A | 6/2000 | Arai et al. | |
| 6,081,830 A | 6/2000 | Schindler | |
| 6,081,907 A | 6/2000 | Witty et al. | |
| 6,098,106 A | 8/2000 | Philyaw et al. | 709/238 |
| 6,128,255 A | 10/2000 | Yankowski | |
| 6,131,129 A | 10/2000 | Ludtke et al. | |
| 6,131,130 A | 10/2000 | Van Ryzin | |
| 6,154,773 A | 11/2000 | Roberts et al. | |
| 6,161,132 A | 12/2000 | Roberts et al. | |
| 6,195,693 B1 | 2/2001 | Berry et al. | |
| 6,201,176 B1 | 3/2001 | Yourlo | |
| 6,230,192 B1 | 5/2001 | Roberts et al. | |
| 6,230,207 B1 | 5/2001 | Roberts | |
| 6,240,459 B1 | 5/2001 | Roberts et al. | |
| 6,243,328 B1 | 6/2001 | Fenner et al. | |
| 6,243,725 B1 | 6/2001 | Hempleman et al. | |
| 6,247,022 B1 | 6/2001 | Yankowski | |
| 6,260,059 B1 * | 7/2001 | Ueno et al. | 709/202 |
| 6,263,505 B1 | 7/2001 | Walker et al. | |
| 6,266,429 B1 | 7/2001 | Lord et al. | |
| 6,272,078 B2 | 8/2001 | Yankowski | |
| 6,304,523 B1 | 10/2001 | Jones et al. | |
| 6,308,086 B1 | 10/2001 | Yoshino | |
| 6,324,694 B1 | 11/2001 | Watts et al. | |
| 6,330,593 B1 | 12/2001 | Roberts et al. | |
| 6,345,256 B1 | 2/2002 | Milsted et al. | |
| 6,388,957 B2 | 5/2002 | Yankowski | |
| 6,388,958 B1 | 5/2002 | Yankowski | |
| 6,408,082 B1 | 6/2002 | Rhoads et al. | |
| 6,411,725 B1 * | 6/2002 | Rhoads | 382/100 |
| 6,484,156 B1 * | 11/2002 | Gupta et al. | 707/1 |
| 6,505,160 B1 | 1/2003 | Levy et al. | 704/270 |
| 6,545,209 B1 | 4/2003 | Flannery et al. | |
| 6,601,046 B1 * | 7/2003 | Epstein | 705/57 |
| 6,631,523 B1 | 10/2003 | Matthews, III et al. | |
| 6,633,653 B1 | 10/2003 | Hobson et al. | |
| 6,636,249 B1 | 10/2003 | Rekimoto | |
| 6,647,128 B1 | 11/2003 | Rhoads | |
| 6,658,247 B1 | 12/2003 | Saito | |
| 6,665,417 B1 | 12/2003 | Yoshiura et al. | |
| 6,671,736 B2 | 12/2003 | Virine et al. | |
| 6,674,876 B1 | 1/2004 | Hannigan et al. | |
| 6,700,990 B1 | 3/2004 | Rhoads | |
| 6,737,957 B1 | 5/2004 | Petrovic et al. | |

| | | | |
|---|---|---|---|
| 6,748,533 B1 * | 6/2004 | Wu et al. ............... 713/176 |
| 6,782,116 B1 | 8/2004 | Zhao et al. |
| 6,804,510 B1 | 10/2004 | Bates et al. |
| 6,807,632 B1 | 10/2004 | Carpentier et al. |
| 6,829,368 B2 | 12/2004 | Meyer et al. |
| 6,941,003 B2 | 9/2005 | Ziesig |
| 6,941,275 B1 | 9/2005 | Swierczek |
| 6,952,774 B1 | 10/2005 | Kirovski et al. |
| 6,963,975 B1 | 11/2005 | Weare |
| 6,970,886 B1 * | 11/2005 | Conwell et al. ........... 707/104.1 |
| 6,983,289 B2 | 1/2006 | Commons et al. |
| 6,990,334 B1 | 1/2006 | Ito |
| 6,990,453 B2 | 1/2006 | Wang et al. |
| 6,996,775 B1 * | 2/2006 | Dey et al. ................ 715/256 |
| 7,024,018 B2 | 4/2006 | Petrovic |
| 7,080,253 B2 | 7/2006 | Weare |
| 7,082,394 B2 | 7/2006 | Burges et al. |
| 7,152,021 B2 | 12/2006 | Alattar et al. |
| 7,159,117 B2 | 1/2007 | Tanaka |
| 7,181,543 B2 | 2/2007 | King et al. |
| 7,188,248 B2 | 3/2007 | Watson |
| 7,302,574 B2 | 11/2007 | Conwell et al. |
| 7,343,553 B1 | 3/2008 | Kaye |
| 7,346,649 B1 | 3/2008 | Wong |
| 7,349,552 B2 | 3/2008 | Levy et al. |
| 7,349,555 B2 | 3/2008 | Rhoads |
| 7,415,129 B2 | 8/2008 | Rhoads |
| 7,461,136 B2 | 12/2008 | Rhoads |
| 7,477,739 B2 | 1/2009 | Haitsma et al. |
| 7,549,052 B2 | 6/2009 | Haitsma et al. |
| 7,587,602 B2 | 9/2009 | Rhoads |
| 7,590,259 B2 | 9/2009 | Levy et al. |
| 2001/0004338 A1 | 6/2001 | Yankowski |
| 2001/0014868 A1 * | 8/2001 | Herz et al. ............... 705/14 |
| 2001/0030827 A1 | 10/2001 | Morohashi |
| 2001/0031066 A1 * | 10/2001 | Meyer et al. ............ 382/100 |
| 2001/0052028 A1 | 12/2001 | Roberts |
| 2001/0053943 A1 | 12/2001 | Kaneko et al. |
| 2002/0023020 A1 | 2/2002 | Kenyon et al. |
| 2002/0033844 A1 | 3/2002 | Levy et al. |
| 2002/0059208 A1 | 5/2002 | Abe et al. |
| 2002/0078359 A1 | 6/2002 | Seok et al. |
| 2002/0116195 A1 | 8/2002 | Pitman et al. |
| 2002/0120849 A1 | 8/2002 | McKinley et al. |
| 2002/0178410 A1 | 11/2002 | Haitsma et al. |
| 2003/0023852 A1 | 1/2003 | Wold |
| 2003/0028796 A1 | 2/2003 | Roberts et al. |
| 2003/0033321 A1 | 2/2003 | Schrempp et al. |
| 2003/0046283 A1 | 3/2003 | Roberts |
| 2003/0086341 A1 | 5/2003 | Wells et al. |
| 2003/0097338 A1 | 5/2003 | Mankovich et al. |
| 2003/0135513 A1 | 7/2003 | Quinn et al. |
| 2004/0003398 A1 | 1/2004 | Donian et al. |
| 2004/0028281 A1 | 2/2004 | Cheng et al. |
| 2004/0128512 A1 | 7/2004 | Sharma et al. |
| 2004/0167858 A1 | 8/2004 | Erickson |
| 2004/0172411 A1 | 9/2004 | Herre et al. |
| 2004/0260682 A1 | 12/2004 | Herley et al. |
| 2005/0004941 A1 | 1/2005 | Kalker et al. |
| 2006/0041753 A1 | 2/2006 | Haitsma |
| 2006/0075237 A1 | 4/2006 | Seo et al. |
| 2006/0143190 A1 | 6/2006 | Haitsma et al. |
| 2006/0206563 A1 | 9/2006 | Van De Sluis |
| 2006/0218126 A1 | 9/2006 | De Ruijter et al. |
| 2007/0071330 A1 | 3/2007 | Oostveen et al. |
| 2007/0106405 A1 | 5/2007 | Cook et al. |
| 2007/0274519 A1 | 11/2007 | Cohen et al. |
| 2008/0222232 A1 | 9/2008 | Allen et al. |
| 2008/0263360 A1 | 10/2008 | Haitsma et al. |
| 2008/0274687 A1 | 11/2008 | Roberts et al. |

FOREIGN PATENT DOCUMENTS

| | | |
|---|---|---|
| DE | 44 27 046 C2 | 2/2001 |
| EP | 194143 | 9/1986 |
| EP | 0283570 A3 | 9/1988 |
| EP | 0367585 A2 | 5/1990 |
| EP | 460869 | 12/1991 |
| EP | 0319567 B1 | 2/1993 |
| EP | 0580361 A2 | 1/1994 |
| EP | 0814419 | 12/1997 |
| EP | 0936531 A2 | 8/1999 |
| EP | 0991213 A2 | 4/2000 |
| EP | 1107254 A2 | 6/2001 |
| EP | 1128385 A1 | 8/2001 |
| EP | 0680040 A2 | 11/2005 |
| EP | 1197020 B1 | 11/2007 |
| GB | 2338869 A1 | 12/1999 |
| JP | 63-104099 | 5/1988 |
| JP | 04299399 | 10/1992 |
| JP | 40299399 | 10/1992 |
| JP | 06-225799 | 8/1994 |
| JP | 06315298 | 11/1994 |
| JP | 07-078407 | 3/1995 |
| JP | 10171818 | 6/1998 |
| JP | 10-233081 | 9/1998 |
| JP | 11-164361 | 6/1999 |
| JP | 11-261961 | 9/1999 |
| JP | 2000-215653 | 8/2000 |
| JP | 2000215653 A2 | 8/2000 |
| JP | 2000-285237 | 10/2000 |
| JP | 2000-305578 | 11/2000 |
| JP | 2001-005497 | 1/2001 |
| JP | 2001101822 A2 | 4/2001 |
| JP | 2001155469 A2 | 6/2001 |
| JP | 2001216766 A2 | 8/2001 |
| JP | 2001-283568 | 10/2001 |
| JP | 2001283568 A2 | 10/2001 |
| WO | WO-9120082 | 12/1991 |
| WO | WO-9705616 A1 | 2/1997 |
| WO | WO-9721291 | 6/1997 |
| WO | WO9721291 | 6/1997 |
| WO | WO-9741504 | 11/1997 |
| WO | WO-9800788 | 1/1998 |
| WO | WO-9802820 | 1/1998 |
| WO | WO9825269 | 6/1998 |
| WO | WO-9935771 | 7/1999 |
| WO | WO9935771 | 7/1999 |
| WO | WO-0128222 | 4/2001 |
| WO | WO-0155889 A1 | 8/2001 |
| WO | WO-0211123 A3 | 2/2002 |
| WO | WO-02065782 A1 | 8/2002 |
| WO | WO-03012695 A2 | 2/2003 |
| WO | WO-2004077430 | 2/2004 |
| WO | WO-2006044622 | 4/2006 |
| WO | WO-2007022533 A2 | 2/2007 |

OTHER PUBLICATIONS

Deane, E. , "International Search Report", *PCT*, (Aug. 23, 2000),4 pages.

"International Application Serial No. 2002-565363, Non-Final Office Action mailed Oct. 11, 2007", With English Translation,22 pgs.

"International Application Serial No. IN/PCT/2002/1689, First Examination Report Jun. 20, 2007", 2 pgs.

*Information Retrieval (Z39.50): Application Service Definition and Protocol Specification*, ANSI/NISO Z39.50 1995,(Jul. 1995), 163 pgs.

*GeoPac Management Guide, Release 1.25*, Geac Computer Corporation Limited,(Dec. 1994),50 pgs.

*The MusicBrainz Mailing List Archive for Nov. 2000*, 30 pgs.

"U.S. Appl. No. 09/976,038, Notice of Allowance and Fee(S) Due mailed Jun. 28, 2007", 4 pgs.

"U.S. Appl. No. 10/073,772 Advisory Action mailed Jul. 28, 2006", 3 pgs.

"U.S. Appl. No. 10/073,772 Final Office Action mailed Apr. 6, 2006", 21 pgs.

"U.S. Appl. No. 10/073,772 Non Final Office Action mailed Sep. 19, 2005", 13 pgs.

"U.S. Appl. No. 10/073,772 Notice of Allowance mailed Feb. 28, 2007", 6 pgs.

"U.S. Appl. No. 10/073,772 Notice of Allowance mailed Aug. 9, 2007", NOAR,10 pgs.

"U.S. Appl. No. 10/073,772 Notice of Allowance mailed Sep. 6, 2006", 5 pgs.

"U.S. Appl. No. 10/073,772 Response filed Mar. 17, 2006 to Non Final Office Action mailed Sep. 19, 2005", 12 pgs.
"U.S. Appl. No. 10/073,772 Response filed Jul. 6, 2006 to Final Office Action mailed Apr. 6, 2006", 8 pgs.
"U.S. Appl. No. 10/073,772 Response filed Aug. 7, 2006 to Advisory Action mailed Jul. 28, 2006", 3 pgs.
"U.S. Appl. No. 10/533,211 Non Final Office Action mailed Nov. 14, 2006", 9 pgs.
"U.S. Appl. No. 10/533,211 Non Final Office Action mailed Jun. 12, 2007", 8 pgs.
"U.S. Appl. No. 10/548,702 Response filed Aug. 29, 2007 to Non-Final Office Action mailed Jun. 21, 2007", 64.
"U.S. Appl. No. 10/548,702 Non-Final Office Action mailed Jun. 21, 2007", 18 pgs.
"U.S. Appl. No. 10/533,211, Response filed Oct. 1, 2007 to Non-Final Office Action mailed Jun. 12, 2007", 12 pgs.
"CD-I Has a Rough Road to Hoe", http://www.caruso.com/Digital_Media/DM91-07.text, (Jul. 1991),43 pgs.
"CEDIA, "Electronic Lifestyles Awards for Manufactures Excellence", Entry for Best Video Product, Power Play,", (Sep. 1999),pp. 1-4.
"Chapter 69—Introduction to Multimedia Services" *Microsoft Win32 Programmer's Reference*, vol. 2, Redmond, Wash. : Microsoft Press,(1993),517-672.
"CNET: The Computer Network Unveils Revolutionary Internet Advertising Tools that Allow Custom Banner Ad Delivery Based on Demographic Information", http://www.cnet.com/html/aboutcnet/press/1994_95/120695.html, Press Releases,(Dec. 6, 1995),4 pgs.
"European Application Serial Number 01 976124 Office Action dated Mar. 16, 2007", (Mar. 16, 2007),5 pgs.
"European Patent Application No. 03737399.0 Office Action", (Mar. 26, 2007).
"Generic coding of moving pictures and associated audio information, part 2", *ISO/IEC*, (1995).
"Information technology—Multimedia content description interface—Part 4: Audio.",*INCITS/ISO/IEC 15938-4-2002*, (2002),1-114.
"International Application No. PCT/US06/32722 Search Report and Written Opinion mailed Apr. 25, 2007",6 pgs.
Baugher, Mark , et al., "A multimedia client to the IBM LAN server", *Proceedings of the first ACM International Conference on Multimedia*, (1993),105-112.
Berners-Lee, T. , et al., *Hypertext Transfer Protocol—HTTP 1.0*, Network Working Group,(May 1996),61 pgs.
Broder, A. Z., et al., "Syntactic clustering of the Web", *Computer Networks and ISDN Systems*, 29(8-13), (Sep. 1997),1157-1166.
Chen, Qin-Sheng , et al., "Symmetric Phase-Only Matched Filtering of Fourier-Mellin Transforms for Image Registration and Recognition", *IEEE Transactions on Pattern Analysis and Machine Intelligence*, 16 No. 12, New York, (Dec. 1994),1156-1168.
Cheung, D. , et al., "A content-based search engine on medical images for telemedicine" *Proceedings of the 21st International Computer Software and Applications Conference*, (Aug. 13, 1997),569-572.
Chua, T. S., et al., "Content-based retrieval of segmented images", *Proceedings of the Second ACM International Conference on Multimedia*, (1994),211-218.
Comer, Douglas E., et al., *Internetworking with TCP/IP, vol. 2, Design, implementation, and internals*, ANSI C Version, 3rd Edition, Upper Saddle River, NJ: Prentice Hall,(1999),1-660.
Comer, Douglas E., et al., *Internetworking with TCP/IP, volume 3, Client-server programming and applications*, BSD Socket Version, Upper Saddle River, NJ: Prentice Hall,(1993),1-498.
Comer, Douglas , et al., "Chapter 4—Internet Addresses & Chapter 5—Mapping Internet Addresses to Physical Addresses (ARP)", *Internetworking with TCP/IP*, vol. 1. Upper Saddle River, N.J. : Prentice Hall,(1995),59-88, 588.
De Roure, David , et al., "A Multiagent system for Content Based Navigation of Music", *Proc. ACM Multimedia*, 99 (Part 2), (1999),63-66.
Deep, John , et al., *Developing CGI applications with Perl*, New York : Wiley Computer Pub.,(1996),72-77.

Fletcher, Peter A., et al., "Direct Embedding and Detection of RST Invariant Watermarks", *F.A.P. Petitcolas* (Ed.): IH 2002, LNCS 2578 Springer-Verlag Berlin Heidelberg, (2003),129-144.
Haitsma, J. , et al., "A Highly Robust Audio Fingerprinting System", *ISMIR 2002—3rd International Conference on Music Information Retrieval*, http://ismir2002.ismir.net/proceedings/02-fp04-2.pdf,(Oct. 17, 2002),1-9.
Haitsma, Jaap , "Robust Audio Hashing for Content Identification", *Philips Research*, 8 pages.
Haitsma, J. A., et al., "Robust Hashing of Multimedia Content", (Dec. 14, 2000),10 pgs.
Kan, Ti , *XMCD Version 2.0 patchlevel 0*, BSD News Article 64976,(Apr. 3, 1996),10 pgs.
Kan, Ti , *XMCD Unix CD Player*, (Mar. 21, 1996),1358 pgs.
Kurth, Frank , et al., "Full-Text Indexing of Very Large Audio Data Bases", *Audio Engineering Society Convention Paper, 110th Convention*, Amsterdam, (May 2001),1-11.
Lewis, Paul H., et al., "Media-based Navigation with Generic Links", *Proceedings of the the Seventh ACM Conference on Hypertext*, (1996),215-223.
Lienhart, R. , "Automatic text recognition for video indexing", *Proceedings of the Fourth ACM International Conference on Multimedia*, (1997),11-20.
Lin, Ching-Yung , et al., "Rotation, Scale, and Translation Resilient Watermarking for Images" *IEEE Transactions on Image Processing*. vol. 10, No. 5, (May 2001),767-782.
Little, T. D., et al., "A digital on-demand video service supporting content-based queries", *Proceedings of the First ACM International Conference on Multimedia*, (1993),427-436.
Martin, Keith D., et al., "Music Content Analysis through Models of Audition", (1998),8 pgs.
Mayer-Patel, Ketan , et al., "Synchronized continuous media playback through the World Wide Web", *Proceedings of the Fourth ACM International Conference on Multimedia*, (1997),435-436.
McNab, Rodger J., et al., "Towards the digital music library: tune retrieval from acoustic input", *Proceedings of the First ACM International Conference on Digital Libraries*, (1996),11-18.
Neuschmied, Helmut , et al., "Content-based Identification of Audio Titles on the Internet", *Proceedings of the First International Conference on WEB Delivering of Music*,(2001),5 pages.
Oostveen, J. , et al., "Feature Extraction and a Database Strategy for Video Fingerprinting", *Lecture Notes in Cormputer Science*, 2314,(Mar. 11, 2002),117-128.
Oostveen, Job , "Visual Hashing of Digital Video: Applications and Techniques", 11 pages.
Pereira, Shelby , "Template Based Recovery of Fourier-Based Watermarks Using Log-Polar and Log-log Maps" *IEEE Int. Conf on Multimedia Computing and Systems*, Florence, Italy, (Jun. 1999),1-5.
Prabhakaran, B. , et al., "Synchronization models for multimedia presentation with user participation", *Proceedings of the First ACM International Conference on Multimedia*, (1993),157-166.
Qazi, Naveed U., et al., "A synchronization and communication model for distributed multimedia objects" *Proceedings of the First ACM International Conference on Multimedia*, (1993),9 pgs.
Rajasekaran, P. , et al., "Microcomputer Implementable Low Cost Speaker-Independent Word Recognition", *IEEE International Conference on ICASSP '83, Acoustics, Speech, and Signal Processing*, Abstract; p. 754, right-hand column, Appendix A, A.1, A.2; figure 1,(Apr. 14-16, 1983),753-756.
Rhoads, Geoffrey B., et al., "Managing on-line media library through links in media signals", U.S. Appl. No. 60/178,028.
Roscheisen, M. , et al., "Beyond browsing: shared comments, SOAPs, trails, and on-line communities", *Computer Networks and ISDN Systems*, 27(6), (Apr. 1995),739-749.
Schneider, Marc , et al., "A Robust Content Based Digital Signature for Image Authentication", *International Conference on Image Processing*, 1996, Proceedings., vol. 3, (1996),227-230.
Schneier, Bruce , "Chapter 16, Pseudo random sequence generators", *In Applied Cryptography*, John Wiley & Sons, New York, US, 1996 ,372-379.
Shafer, Keith , et al., "Introduction to Persistent Uniform Resource Locators", http://purl.oclc.org/docs/inet96.html, OCLC Online Computer Library Center, Inc.,(1996),8 pgs.

Slashdot, "Machine Learning and MP3s", [Online]. Retrieved from the Internet: <URL: HTTP://www.Slashdot.org/article.pl?sid=03/04/21/110236&mode=thread&tid=141>, 12 pgs.

Smith, Brian C., et al., "The Berkeley continuous media toolkit", *Proceedings of the Fourth ACM International Conference on Multimedia*, (1997),451-452.

Subramanya, S R., et al., "Transform-Based Indexing of Audio Data for Multimedia Databases", *1997 IEEE*, (1997),211-218.

Weitzman, L., et al., "Automatic presentation of multimedia documents using relational grammars", *Proceedings of the Second ACM International Conference on Multimedia*, (1994),443-451.

Wells, Maxwell J., et al., "Music Search Methods Based on Human Perception", U.S. Appl. No. 09/556086, filed Apr. 21. 2000.

Welsh, Matt, et al., "Querying Large Collections of Music for Similarity", *Technical Report UCB/CSD0-1096, U.C. Berkeley Computer Science Division*, Research sponsored by Advanced Research Projects Agency under grant DABT63-98-C-0038, and equipment grant from Intel Corp.,(Nov. 1999),13 pages.

Wold, E., "Content-based classification, search,. and retrieval of audio", *IEEE MultiMedia*, 3(3), (Fall 1996),27-36.

Yang, Cheng, "MACS: Music Audio Characteristic Sequence Indexing for Similarity Retrieval", *Supported by Leonard J. Shustek Fellowship, Stanford Graduate Fellowship program, and NSF Grant IIS-9811904 New Paltz, New York* (Oct. 2001),123-126.

Zhang, Hongjiang, et al., "Video Parsing, Retrieval and Browsing: An Integrated and Content-Based Solution", *ACM Multimedia 95—Electronic Proceedings*, San Francisco, California,(Nov. 5-9, 1995),19 pgs.

"U.S. Appl. No. 09/976,038 Final Office Action Mailed Aug. 18, 2008", FOAR, 12 Pgs.

"U.S. Appl. No. 10/073,772, Preliminary Amendment filed Jul. 28, 2008", 10 pgs.

"U.S. Appl. No. 10/503,245, Response filed Aug. 28, 2008 to Final Office Action mailed May 28, 2008", 13 pgs.

"U.S. Appl. No. 10/503,245, Notice of Allowance mailed Sep. 4, 2008", 16 pgs.

"U.S. Appl. No. 10/533,211 Non-Final Office Action mailed Jul. 29, 2008", 14 Pgs.

"U.S. Appl. No. 10/534,323, Response filed Jul. 16, 2008 to Non Final Office Action mailed Apr. 16, 2008", 9 pgs.

"U.S. Appl. No. 11/432,989 Non-Final Office Action mailed Jun. 11, 2008", 9 pgs.

"Japanese Application Serial No. 2002-565363, Final Office Action mailed Jul. 14, 2008", 12 pgs.

"Japanese Application Serial No. 2006-330002, Office Action mailed Jun. 10, 2008", 5 pgs.

"Korean Application Serial No. 10-2002-7005203, Office Action mailed May 28, 2008", 8 pgs.

"Korean Application Serial No. 10-2002-7013737, Final Office Action mailed Sep. 1, 2008", 5 pgs.

Ido, S, "Multimedia Research Forefront-5", *Business Communications*, 34,(3),(Mar. 1, 1997), 3 pgs.

Stephen, D., "the Exploratory Workshop on Music Information Retrival", *Acm SIGIR*, FOAR, (1999), pp. 1-14.

"U.S. Appl. No. 09/976,038, Non Final Office Action mailed Jan. 4, 2007", 6 pgs.

"U.S. Appl. No. 09/976,038, Non Final Office Action mailed Jan. 9, 2004", 8 pgs.

"U.S. Appl. No. 09/976,038, Notice of Allowance mailed Jun. 8, 2006", 4 pgs.

"U.S. Appl. No. 09/976,038, Notice of Allowance mailed Oct. 22, 2004", 7 pgs.

"U.S. Appl. No. 09/976,038, Response filed Oct. 15, 2001 to Non Final Office Action mailed May 16, 2007", 8 pgs.

"U.S. Appl. No. 09/976,038, Response filed Oct. 15, 2001 to Non Final Office Action mailed Jun. 8, 2004", 7 pgs.

"U.S. Appl. No. 10/073,772, Notice of Allowance mailed May 23, 2008", 4 pgs.

"U.S. Appl. No. 10/073,772, Non-Final Office Action Mailed Jan. 9, 2008", 14 pgs.

"U.S. Appl. No. 10/503,245, Response filed Feb. 26, 2008 to Non-Final Office Action mailed Nov. 26, 2007", 13 pgs.

"U.S. Appl. No. 10/503,245, Final Office Action mailed on May 28, 2008", 23 pgs.

"U.S. Appl. No. 10/503,245, Non-Final Office Action mailed Nov. 26, 2007", 10 pgs.

"U.S. Appl. No. 10/529,360, Non-Final Office Action mailed Apr. 23, 2008", 10 pgs.

"U.S. Appl. No. 10/533,211, Response filed Mar. 5, 2008 to Final Office Action mailed Dec. 15, 2007", 6 pgs.

"U.S. Appl. No. 10/533,211, Response filed May 13, 2008 to Final Office Action mailed Dec. 5, 2007", 13 pgs.

"U.S. Appl. No. 10/533,211 Final Office Action mailed Dec. 5, 2007", 13 pgs.

"U.S. Appl. No. 10/534,323, Non-Final Office Action mailed Apr. 16, 2008", 7 pgs.

"U.S. Appl. No. 10/534,323, Response filed Jan. 3, 2008 to Non-Final Office Action mailed Oct. 3, 2007", 9 pgs.

"U.S. Appl. No. 10/534,323, Non-Final Office Action mailed Oct. 3, 2007", 8 Pages.

"International Application Serial No. 01976124.6, Office Action mailed Jan. 2, 2008", 7 pgs.

"International Application Serial No. 03798257.6, Office Action mailed Feb. 7, 2008", 6 pgs.

"International Application Serial No. 1976124.6, Office Action mailed Aug. 4, 2005", 4 pgs.

Haitshma, J., et al., "Speed- Change Resistant Audio fingerprinting using Auto-correlation", *Philips Research Laboratories Eindhoven, IEEE*, (2003), pp. 728-731.

Stephen, D., "The Exploratory Workshop on Music Information Retrieval", ACM SIGIR, (Aug. 19, 1999), 1-14.

"U.S. Appl. No. 10/073,772, Notice of Allowance mailed Nov. 19, 2008", 7 pgs.

"U.S. Appl. No. 10/073,772, Supplemental Notice of Allowability mailed Nov. 2, 2006", 4 pgs.

"U.S. Appl. No. 10/529,360, Non-Final Office Action mailed Oct. 16, 2008", 14 pgs.

"U.S. Appl. No. 10/529,360, Response filed Feb. 16, 2009 to Non-Final Office Action mailed Oct. 16, 2008", 9 pgs.

"U.S. Appl. No. 10/529,360, Response filed Sep. 23, 2008 to Non-Final Office Action mailed Apr. 23, 2008", 9 pgs.

"U.S. Appl. No. 10/533,211, Advisory Action mailed Mar. 25, 2008", 3 pgs.

"U.S. Appl. No. 10/533,211, Final Office Action mailed Dec. 17, 2008", 16 pgs.

"U.S. Appl. No. 10/533,211, Response filed Feb. 16, 2009 to Final Office Action mailed Dec. 17, 2008", 11 pgs.

"U.S. Appl. No. 10/533,211, Response filed Oct. 29, 2008 to Non-Final Office Action mailed Jul. 29, 2008", 13 pgs.

"U.S. Appl. No. 10/534,323, Non-Final Office Action mailed Oct. 31, 2008", 7 pgs.

"U.S. Appl. No. 10/534,323, Response filed Jan. 29, 2009 to Non-Final Office Action mailed Oct. 31, 2008", 9 pgs.

"U.S. Appl. No. 11/432,989, Response filed Oct. 13, 2008 to Non-Final Office Action mailed Jun. 11, 2008", 10 pgs.

"U.S. Appl. No. 11/432,989, Response filed Mar. 2, 2009 to Non-Final Office Action mailed Dec. 2, 2008", 11 pgs.

"U.S. Appl. No. 11/432,989, Non-Final Office Action mailed Dec. 2, 2008", 7 pgs.

"Korean Application No. 10-2002-7005203, Office Action Mailed Jan. 13, 2009", 6 pages.

"A Highly Robust Audio Fingerprint System", 2002, 107-115.

"U.S. Appl. No. 10/529,360, Final Office Action mailed Apr. 17, 2009", 15 pgs.

"U.S. Appl. No. 10/534,323, Final Office Action mailed May 13, 2009", 12 pgs.

"U.S. Appl. No. 10/534,323, Response filed Jul. 13, 2009 to Final Office Action mailed May 13, 2009", 11 pgs.

"U.S. Appl. No. 11/432,989, Final Office Action mailed Jun. 26, 2009", 10 pgs.

"U.S. Appl. No. 11/466,056, Non-Final Office Action mailed Jul. 16, 2009", 30 pgs.

03809813.3, "European Application Serial No. 03809813.3 ,office Action Mailed on Jan. 14, 2009", 8.

Haitsma, et al., "Robust Audio Hashing for Content Identification", (Sep. 2001).

"U.S. Appl. No. 10/533,211, Advisory Action mailed Mar. 11, 2009", 3 pgs.

"U.S. Appl. No. 10/534,323, Non-Final Office Action mailed Sep. 21, 2009", 7 Pgs.

"U.S. Appl. No. 10/534,323, Response filed Dec. 18, 2009 to Non Final Office Action mailed Sep. 21, 2009", 12 pgs.

"U.S. Appl. No. 11/432,989, Non-Final Office Action mailed Nov. 18, 2009", 10.

"U.S. Appl. No. 11/432,989, Response filed Sep. 28, 2009 to Final Office Action mailed Jun. 26, 2009", 13 pgs.

"European Application No. 09172380.9, European Search Report Mailed Nov. 23, 2009", 8 pgs.

"European Application Serial No. 03737399.0, Summons to Attend Oral Proceedings Received mailed Aug. 7, 2009", 9 pgs.

Hearst, M., et al., "The Exploratory Workshop on Music Information Retrieval", *International Conference on Research and Development in Information Retrieval*, Berkeley, CA (Aug. 19, 1999), 1-14.

"U.S. Appl. No. 10/073,772, Response filed Jan. 3, 2006 to Non Final Office Action mailed Sep. 19, 2005", 21 pgs.

"U.S. Appl. No. 10/533,211, Examiner Interview Summary mailed Sep. 24, 2007", 4 pgs.

"U.S. Appl. No. 10/534,323, Non-Final Office Action mailed Mar. 18, 2010", 7 pgs.

"U.S. Appl. No. 11/432,989 Notice of Allowance mailed Jul. 29, 2010", 13 pgs.

"U.S. Appl. No. 11/432,989, Response filed Apr. 19, 2010 to Non Final Office Action mailed Nov. 18, 2009", 13 pgs.

"U.S. Appl. No. 11/799,865 Non-Final Office Action mailed Aug. 18, 2010", 14 pgs.

"U.S. Appl. No. 11/799,865 Restriction Requirement mailed out on Apr. 28, 2010", 7.

"U.S. Appl. No. 11/800,904, Non-Final Office Action mailed May 12, 2010", 10 pgs.

"U.S. Appl. No. 11/800,904, Response filed Apr. 15, 2010 to Restriction Requirement mailed Mar. 17, 2010", 5 pgs.

"U.S. Appl. No. 11/800,904, Response filed Aug. 12, 2010 to Non Final Office Action mailed May 12, 2010", 10 pgs.

"U.S. Appl. No. 11/800,904, Restriction Requirement mailed Mar. 17, 2010", 6 pgs.

"Japanese Application Serial No. 2002-565363, Office Action mailed Jul. 12, 2010", 4 Pgs.

\* cited by examiner

METHOD OF ENHANCING RENDERING OF CONTENT ITEM, CLIENT SYSTEM AND SERVER SYSTEM

The invention relates to a method of enhancing rendering of a content item.

The invention further relates to a client system arranged for enhanced rendering of a content item.

The invention further relates to a server arranged for facilitating enhanced rendering of a content item.

Electronic commerce provides unprecedented opportunities for consumers to browse, select and purchase products, and also provides opportunities for alternative market and sales techniques. Conventionally, electronic commerce requires a somewhat pro-active consumer role. The consumer searches the Internet for a particular product, selects a vendor and submits a request to purchase the item. Alternatively, a consumer visits a website for information, perhaps with no intent to purchase anything, and is presented an advertisement for a product. Then the consumer "clicks" on the advertisement, decides whether to purchase the item, and then submits the purchase request. In like manner, the consumer receives e-mail containing an advertisement, reviews the information, either directly or via an Internet link, decides whether to purchase the product, and then submits the purchase request. In each of these scenarios, the consumer utilizes a bi-directional communications device to contemporaneously receive the information and submit the purchase request.

As is well known in the art of marketing and advertising, "impulse shopping" provides an opportunity for significant product revenue. Products are placed within easy reach while waiting in a cashier queue, "specials" are announced over loudspeaker systems in a department store, and so on. Television commercials often contain a notification of a telephone number to call to order a product being advertised, or to order a copy of the program being broadcast at that time. This technique has been applied to e-commerce systems, for example by providing "click here to purchase" icons on webpages or e-mail advertisements. The opportunities for impulse shopping, however, are limited to the specific environments or occasions that allow for such impulse buys, and, in the case of e-commerce, typically require a contemporaneous bi-directional communications link between the consumer and the product supplier.

Digital broadcasting systems will make a large amount of content items available to users. Current Internet-enabled content receiving systems, such as real-time audio receivers, allow a user to store an identifier for a content item in a local database, to serve as a bookmark to retrieve the item later so it can be processed again. If the user likes such a bookmarked item, he may want to shop for it at an e-commerce system. The current procedure to do this is rather cumbersome. First, the user must find the identifier, and then go to the e-commerce system and try to find it. He might have to look for it using different identifiers. Usually the identifier is a code such as an ISBN, which is hard to remember and easy to mistype. Further, the identifier may not even be shown to the user or be present in his bookmark file. The user then cannot know easily which item he is supposed to look for. By the time he has found it, his impulse to buy it will long since have gone.

International Patent Application WO 97/21291 discloses a radio broadcasting system which maintains a database with descriptions of the songs and other audio content it broadcasts. The database is indexed to allow a listener to select a particular description, e.g. the song currently playing, the song last played, etcetera. When a listener hears a particular piece of audio he likes, he can call a special telephone number to access the database, and use the touch tones on his telephone to navigate the database, select descriptions and optionally buy selected songs.

European Patent Application EP-A-0 991 213 discloses a method and device for transmitting digital information, such as digital audio data, together with additional information. The additional information can be for instance the jacket photo, song titles, lyrics, the artist's name, and so on. The transmitting device disposes the additional in the digital audio data itself by creating a number of data frames, and multiplexing them with the frames that make up the digital audio data. The transmitting device receives the multiplexed data and audio frames, demultiplexes them and uses the additional information to enhance the presentation of the digital audio data for the user, e.g. by presenting the title and artist's name when playing the audio.

When the user likes the digital audio data, he can press a "bookmark button". Upon pressing this button, the receiving device stores an identifier for the digital audio data, so that it can be recalled and played back again later. The method according to this European Patent Application requires that the server system disposes the additional information in the content before transmitting it to the client system. This increases the size of the content to be transmitted and requires that the server system knows in advance which additional information is desired in the client system.

It is an object of the invention to provide a method according to the preamble, which is more flexible than the known method.

This object is achieved according to the invention in a method comprising receiving a portion of the content item from a client system, processing the received portion to obtain an identifier for the content item, obtaining further information on the content item using the identifier, and transmitting the further information to the client system.

A client system can only play back the content item, but not present extra information such as a photo of the artist, or the lyrics of the content item as well, unless this extra information is also present in the content item. However, simply embedding the extra information is not very flexible, since it is impossible to update or extend it at a later time. By identifying the content item in a server system, retrieving the extra information from a database and sending back the extra information, the presentation of the content item can be enhanced in a more flexible manner. For example, updated photos or concert information can be provided in this manner.

It is an object of the invention to provide a client system according to the preamble, which can operate in a more flexible manner than the known client system.

This object is achieved according to the invention in a client system comprising a receiver for receiving the content item, input means for marking the received content item, and tracking means for in response to said marking automatically providing identifying data for the marked content item to a remote server system, and for subsequently receiving further information on the content item from the remote server system.

The client system, which can be a system such as a television receiver, a set-top box, a radio or a general Internet-enabled computer, but also a mobile telephone or portable audio player, allows the user to mark content items, such as television programs, music tracks or items shown in advertisements, as being of interest. Identifying data for the content item is then submitted to a remote server system, which retrieves extra information such as title, artist or performer, photos and lyrics and transmits that extra information back to the client system. The client system then displays the extra information as appropriate, which enhances the playback of the content item in the eyes of the user.

Since the extra information is not embedded in the content item itself, but rather retrieved from a remote server when the user asks for it, the extra information that is sent back can be changed over time. This makes the client system more flexible than the known system.

In an embodiment the identifying data comprises a portion of the marked content item. In order to retrieve the extra information, the server system needs to identify the content item. If the client system cannot determine such an identifier itself, it can submit a portion of the content item in question to the server system. The server system will have more processing power, so it should be able to e.g. detect a watermark in the portion or to make an analysis of the content to extract characteristic features from the portion. Using the watermark information or the characteristic feature, the server system can perform a lookup in a database and retrieve the extra information for the content item.

In a further embodiment the tracking means are arranged for detecting a watermark in the marked content item, and the identifying data comprises an identifier obtained from the detected watermark. One way to supply the identifier for the content item is to embed it in the content item by means of a watermark. The tracking means then performs an analysis of the content item to detect the watermark and to extract the identifier therefrom. The identifier can then be submitted to the server system.

In a further embodiment the further information comprises an identifier for the content item, and the tracking means are arranged for providing the identifier to an e-commerce system. Knowing that a user likes a particular content item is of importance in an e-commerce system, as a user will be more inclined to buy such items, especially at the moment he is confronted with them. For example, if the user hears a song and uses the input means to signal this, he will be more likely to respond positively to an immediate offer to buy a record carrier with the song, such as a CD single, or a digital version of the song, for example in the MP3 format, especially if it is offered at a discount.

Further, the user is now no longer required to actively seek out the content item, or information related to it, on the e-commerce system when it is processed on the device. Rather, he simply marks it using the input module, and he can recall the marked items for further processing, if any, when he is using the e-commerce system.

In a further embodiment the tracking means are arranged for adding the identifier to a shopping list for a user of the e-commerce system. An advantage of this embodiment is that the user is minimally distracted from his listening or viewing experience with the content item, and still has the content item available for shopping when he is ready to do so. He can, for example, go shopping the next morning, and then he will see the marked content item or items on his shopping list and be more inclined to buy it, as he will then recall that he found those items to be of interest the previous day.

In a further embodiment the tracking means are arranged for receiving a list of items related to the marked content item from the e-commerce system in response to providing the identifier to the e-commerce system. An advantage of this embodiment is that it allows for easy browsing of the related items. This way, the user is more inclined to shop from those related items, since they are, by association, also of interest to him.

In a further embodiment the tracking means comprise a tracking buffer for storing the identifier to facilitate automatically providing the identifier to the e-commerce system when the client system is coupled to a transfer device. Portable client systems need not have a direct link to an e-commerce system, yet they should still be able to function in a manner similar to the client system described above. To this end, a portable client system according to the invention can be provided with a tracking buffer, which stores the identifiers until they can be provided to an e-commerce system. This could become possible, for example, when the portable client system comes in the vicinity of a base station or transfer device, or if the user activates a transmit function. The portable client system could be a handheld computer, which the user can connect to a mobile telephone to establish a connection to a network. Once he is connected to the network, the portable client system can automatically provide the identifier stored in the tracking buffer to the e-commerce system.

It is an object of the invention to provide a server system according to the preamble, which can operate in a more flexible manner than the known client system.

This object is achieved according to the invention in a server system comprising receiving means for receiving a portion of the content item from a client system, processing means for processing the received portion to obtain an identifier for the content item, lookup means for obtaining further information on the content item using the identifier, and for transmitting the further information to the client system.

A client system can only play back the content item, but not present extra information such as a photo of the artist, or the lyrics of the content item as well, unless this extra information is also present in the content item. However, simply embedding the extra information is not very flexible, since it is impossible to update or extend it at a later time. By identifying the content item in a server system, retrieving the extra information from a database and sending back the extra information, the presentation of the content item can be enhanced in a more flexible manner. For example, updated photos or concert information can be provided in this manner.

In an embodiment the processing means are arranged for computing a hash value for the received portion of the content item, the identifier comprising the computed hash value. The content item may not have an accompanying identifier, or that identifier may have been lost before the content item arrived at the server system. In such a case, the server system will have to calculate the identifier itself by doing an analysis of the content item. The thusly computed hash value can be used as an identifier to look up the extra information in a database.

Figure 2:
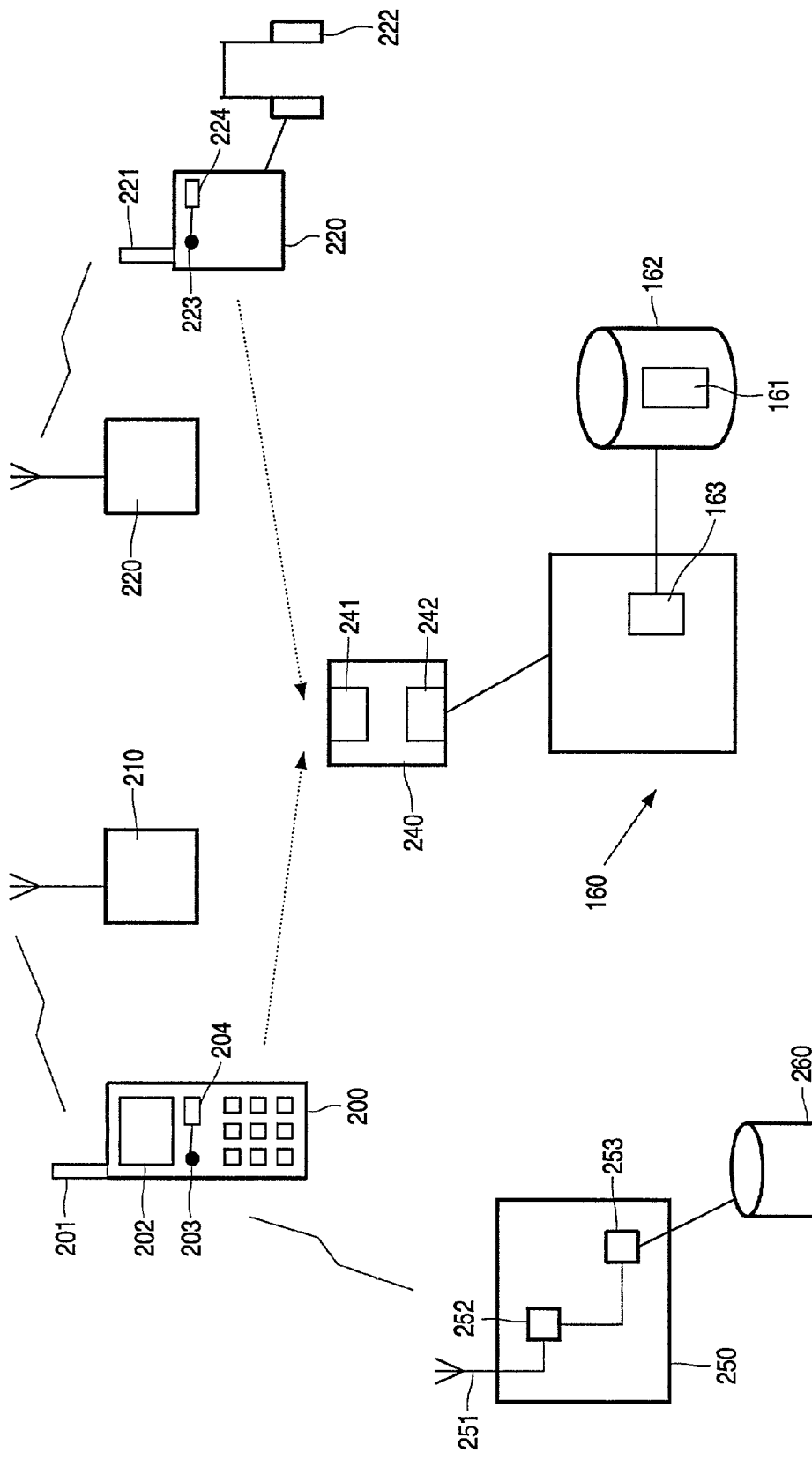

These and other aspects of the invention will be apparent from and elucidated with reference to the embodiments shown in the drawings, in which:

FIG. 1 schematically shows an arrangement comprising a number of client systems and an e-commerce system; and FIG. 2 schematically shows an arrangement comprising a number of portable client systems, transfer devices and an e-commerce system.

Throughout the figures, same reference numerals indicate similar or corresponding features. Some of the features indicated in the drawings are typically implemented in software, and as such represent software entities, such as software modules or objects.

FIG. 1 schematically shows an arrangement comprising a first client system 100, a second client system 130, and an e-commerce system 160. The systems 100, 130, 160 are connected using a network of some kind. This can be for example the Internet, or a cable network, a dial-up phone connection or a combination of networks.

The first client system 100 and the second client system 130 have respective receivers 101, 131. These can be, for instance, an antenna to pick up signals from the ether, or a connection to a cable network or the Internet. Using these receivers 101, 131, the client systems 100, 130 are able to receive content items such as television programs, radio broadcasts, songs, pictures and so on, from a service provider. The thusly-received content items can be rendered by respective rendering modules 102, 132 and output using output modules 103, 133. The exact way in which a content item is rendered depends on the type of client system and the type of content. For instance, in a radio receiver, rendering comprises generating audio signals and feeding it to loudspeakers. For a television receiver, rendering comprises generating audio and video signals and feeding those to a display screen and loudspeakers. For other types of content, a similar appropriate action must be taken.

Rendering may also include operations such as decrypting or descrambling the signal, synchronizing audio and video signals and so on. The client system 100 is shown by way of example as a radio receiver with loudspeakers 103, and the client system 130 is by way of example shown as a television receiver with display screen 133. The client system 130 could also be a set-top box, with the rendering module 132 and screen 133 located elsewhere.

The client systems 100, 130 also have respective input modules 104, 134, shown as buttons on the systems 100, 130 and on a remote control 135. These input modules 104, 134 are used for marking a content item, preferably the content item being rendered, as being of interest to a user. These input modules can be provided as buttons in hardware or in software, be drawn on a display such as display 133 or on a touch-screen area, or be made available as menu items or icons in a user interface for the systems 100, 130. The input modules can also use audio or visual input from the user, for example by detecting a voice control command issued by the user, or detecting a gesture or action by the user, such as raising his thumb towards the input module.

The button 134 can also be provided on a separate control device, such as remote control 135. In that case, pressing the button on the separate control device has the same effect as pressing the button on the client system 130. The input module 104, 134 may be coupled to a confirmation mechanism, to guard against marking undesired content items. In that case, marking a content item comprises using the input module 104, 134 and confirming the use through the confirmation mechanism.

The input modules 104, 134 are coupled to respective tracking modules 106, 136. When a user uses the input module 104, 134 to mark an item as being of interest to him, the tracking module 106, 136 determines an identifier for the marked content item.

Such an identifier is usually provided with the content item. It can be, for example, the Uniform Resource Locator (URL) or other Uniform Content Identifier (URI) of the content item. It can also be a code, such as an ISBN or another number identifying the content item at an e-commerce system. The identifier can also simply be the title of the content item.

If the identifier supplied with the content item is usable outside its original context, then it can be used directly. The tracking module 106, 136 could obtain an identifier using meta-information present with the content item. For example, the title of a movie is usually sufficient to identify it. However, if the identifier is a code which is only used by the provider who supplied the content item, then it needs to be mapped to another code first, which other code can then be used as the identifier. The tracking module 106, 136 could request this other code from the provider, or map it itself.

If there is no identifier supplied with the content item, the tracking module 106, 136 needs to determine one itself. The tracking module 106, 136 can calculate the identifier itself by doing an analysis of the content. For example, an electronic book may contain its ISBN on one of the first pages, and since the format of the ISBN is known, it could be extracted automatically by scanning the text for this known format. The ISBN can then be used as identifier. The identifier may be embedded as a watermark in audio and video content, and the tracking module 106, 136 can analyze the content to detect the watermark and to obtain the identifier.

Not all processing needs to take place in the client system 100, 130 itself. For example, the television receiver 130 could be coupled to a set-top box or gateway to an in-home network to which said television receiver 130 is connected could perform some or all of the processing. Such a distributed processing is especially advantageous when the client system is a mobile device, such as a mobile phone, with only limited processing capabilities. This will become apparent with reference to FIG. 2 below.

Once the tracking module 106, 136 has determined an identifier for the content item, it can obtain more information on the content item and present this to the user. For example, the title, artist or performer of the content item may be shown, or a webpage having more information on the content item could be retrieved and rendered.

The tracking module 106, 136 can further add the identifier for the marked content item to a list, such as a bookmark list of list of favorite items. This way, the user can easily recall the marked content item at a later time.

The tracking module 106, 136 can further provide this identifier to the e-commerce system 160. Providing the identifier to the e-commerce system 160 is preferably done nearly instantaneously, but if for example no permanent connection with the e-commerce system 160 is available, the tracking module 106, 136 must wait until there is such a connection, and then automatically provide the identifier to the e-commerce system 160.

In order to facilitate e-commerce, the user who marked the content item should also be identified in some way, for example using his login name at the e-commerce system 160, or with some other identifier supplied to him by the e-commerce system. If the e-commerce system 160 is available over the World-Wide Web, then it could use a cookie to store an identifier for the user at the client system or at some location where the tracking module 106, 136 can obtain it and send it along with the identifier for the content item to the e-commerce system 160.

The identifier of the marked content item can be used in many ways in the e-commerce system 160. To facilitate direct impulse buying, the identifier can be regarded as a purchase request, and the content item can be shipped to the user without further action being necessary. The identifier can also be added to a shopping list 161 for the user, so he will encounter it at his next time shopping, he will remember it from when he marked it, and he can then order it. This shopping list 161 can have the purpose of a wish list, where the user and his/her friends can see items which the user would like to own, or a list with the contents of a shopping cart with items that should be bought right away, and so on.

The shopping list 161 can be stored in a storage medium 162 at the e-commerce system, where it can be maintained by a list maintenance module 163. It can also be stored in the client system 100, 130, where the user can use it later when he visits the e-commerce system. Storing the wish list or shopping list 161 locally has the advantage that the user can use the same list at multiple e-commerce systems. However, not all systems have the storage space for storing the list 161.

The e-commerce system 160 could also generate a list of items related to the marked content item. For example, when the user listens to a song and marks that, the list could comprise various performances of that song, or various formats in which the song can be bought. It could also comprise other songs by the same singer or band, or other songs on the same theme. If the user marks a television program as being of interest to him, the list could comprise videos with previous episodes of the marked television program, or merchandise such as dolls representing characters in the television programs, books about the program or clothing with a logo for the program.

The e-commerce system 160 could also use a recommendation scheme to determine items that are related to the marked content item. Such a recommendation scheme involves keeping track of which items people buy, and using this to suggest items to the user. For example, if many people who mark a specific TV show as being of interest to them buy a book by one of the actors in the show, then the user who also marked the TV show as being of interest to him could be offered the book in question. Combinations of purchases can also be used as input: if many people buy items X and Y together, and the user bought item X, then item Y should now be on the list, since there is a good chance he might want to buy it. Of course, items X and Y should be related to the marked content item.

Thus, after the list has been generated, the client system 100, 130 receives the list from the e-commerce system 160 in response to the marking of the content item. The client system 100, 130 can then present it to the user. The list is preferably presented to the user in such a way that shopping from it is made very easy. Presenting the list could be done as soon as it arrives, but it could also be delayed until a more appropriate point in time, for example when a commercial break begins or when the song ends. The list could also be redirected to a system from which the user can more comfortably buy the items, such as his computer or television, when he marks content items on a system such as a portable audio player.

The e-commerce system 160 can also use the identifier to create customized offers. For example, if a user marks several items by the same artist as being of interest to him, the e-commerce system 160 could offer him a compilation CD of that artist at a discount. The e-commerce system 160 thus learns from the user's marking of items which items the user likes. This can be used to generate, for example, the above-mentioned list of related items in a more reliable fashion.

FIG. 2 schematically shows an arrangement comprising a first portable client system 200, a second client system 220, first and second base stations 210, 230 and the e-commerce system 160. The portable client systems 200, 220 can be coupled to a transfer device 240 when information needs to be transferred to and from the portable client system. This coupling can be using infrared or radio transmission, or by connecting the portable client system to the transfer device using, for instance, a serial port. The transfer device 240 could be telephone base stations or docking stations. The transfer device 240 and the e-commerce system 160 are connected using a network of some kind. This can be for example the Internet, or a cable network, a dial-up phone connection or a combination of networks.

The portable client systems 200, 220 have respective receivers 201, 221, for instance an antenna to pick up signals from the ether, or a wireless connection to the Internet. Using these receivers 201, 221, the devices 200, 220 are able to receive content items such as television programs, radio broadcasts, songs, pictures and so on, from the base stations 210, 230. The thusly-received content items can be rendered to the user by respective rendering modules 202, 222.

As an illustration, the first portable client system 200 is shown as a mobile telephone comprising antenna 201 and display screen 202, and the second portable client system 220 is shown as a portable audio player comprising an antenna 221 and headphones 222. Other portable client systems, such as handheld computers, are similarly equipped. Most of their functionality is usually be realized in software. The first portable client system 200 can, for example, show content items on its display 202 which are formatted using a standard such as the Wireless Application Protocol (WAP).

The portable client systems 200, 220 have respective input modules 203, 223 for marking the content item being rendered as being of interest to a user. If the portable client systems 200, 220 have a two-way connection with the transfer devices 210, 230, then using the input devices 203, 223 can be handled in the same way as described above with reference to FIG. 1.

However, it is generally known that portable client systems have only limited processing power and battery life. As mentioned above, it then makes sense to distribute part of the processing to obtain an identifier to a remote server 250. This remote server can be operated by the provider who supplied the content item, but this is not necessary.

The server system 250 comprises a receiving module 251, a processing module 252 and a lookup module 253. The receiving module 251 receives a portion of the content item from the client system 200. When the portable client system 200 is a mobile phone, the portion is preferably received by establishing a telephone communication link between mobile phone 200 and server 250 and transferring the portion of the content item over the telephone link. For the end user, this means he only has to call the telephone number of the server system 250 and hold up his mobile phone 200 so the microphone therein picks up an audio signal. This audio signal, which is a portion of the content item, is then transmitted to the server system 250.

The processing module 252 processes the received portion to obtain an identifier for the content item. The identifier is then supplied to a lookup module 253, which obtains further information on the content item from a database 260.

The identifier may be embedded as a watermark in audio and video content, and the processing module 252 can analyze the received portion to detect the watermark and to obtain the identifier. Alternatively, the processing module 252 computes a hash value for the received portion of the content item. The identifier then comprises the computed hash value. Using the identifier found in the watermark or the computed hash value, the lookup module 253 can search in the database 260 for the desired further information.

The further information is subsequently transmitted back to the client system 200. In the case the portable client system 200 is a mobile telephone, this transmission can for example be done by sending an SMS message or a message over an instant messenging service with the further information. The further information can also be e-mailed to an e-mail address for the user of the portable client system 200. This way, more extensive information can be supplied than can be handled by the potentially limited capabilities of the portable client system 200. The portable client system 200 could then, for example, receive an SMS message indicating the title and artist, and a statement that more information was sent to the user's e-mail address.

Portable client systems may not have a two-way connection available, and if they do it may be expensive to use it, so the user will want to use it as little as possible, and in any case use it only when he chooses to do so. A portable radio, for example, can only receive radio signals but not transmit them. A handheld computer can be connected to a mobile phone, but this requires manual intervention by the user. And the user will, given the typical charges for mobile telephony, not do this every time he marks a content item as being of interest to him.

Therefore, in another embodiment, the portable client systems 200, 220 are further provided with respective tracking buffers 204, 224 for storing in response to said marking an identifier for the marked content item to facilitate automatically providing the identifier to the e-commerce system 160.

To automatically provide the identifier to the e-commerce system 160, the portable client system 200, 220 must then be brought in contact with the transfer device 240. This transfer device 240 has a first relay 241 for receiving from the portable client system 200, 220 an identifier for the marked content item. It also has a second relay 242 for automatically providing the received identifier to the e-commerce system 160. Using these relays 241, 242, the identifier is provided from the portable client system 200, 220 to the e-commerce system 160 automatically and transparently to the user.

It is possible for the base stations 210, 230 to serve as a transfer device as well. For example, if the portable client system 200 creates a network connection with the base station 210, then this connection will most likely be two-way, and then the base station 210 can be used to provide the identifier to the e-commerce system 160.

When a portable client system 200, 220 is used, it makes the most sense to maintain the wish list on the e-commerce system 160, since storage space is often very limited on portable client systems. The transfer device 240 can provide the identifier to the e-commerce system 160 for inclusion in the wish list or shopping list 161 of the user. It can also, by means of the second relay 242, obtain a list of items related to the marked content item from the e-commerce system 160.

When the user next connects his portable client system 200, 220 to the transfer device 240, the transfer device 240, by means of the first relay 241, then transfers the list to the portable client system 200, 220. To this end, the transfer device 240 should keep the list in local storage until the portable client system 200, 240 is connected. The transfer device 240 could also, if possible, directly obtain the list from the e-commerce system 160 and transfer it to the portable client system 200, 220 immediately. In any case, the portable client system 200, 220 then presents the list to the user.

The receiving systems 100, 130 could also make use of a transfer device. For example, when the receiving system is a television receiver, the set-top box or gateway to the in-home network to which said television receiver is connected could then assume the role of the transfer device. When the television receiver is turned off before the list could be obtained from the e-commerce system and transferred to the receiver, the set-top box or gateway saves it locally until the television receiver is turned on again, and only then transfers it.

While the input devices 104, 134, 203, 223, the tracking devices 106, 136, and the tracking buffers 204, 224 are presented in the embodiments of FIGS. 1 and 2 as separate components, it will often be the case that these devices and buffers are realized by computer software, which is executed by some central processing unit. Thus, for instance, the input device 134 may be a picture of a button drawn by the system 130, and when the user selects this button using a mouse or other selection aid, the system 130 determines the position on the screen 133 which was selected, concludes that the picture of the button was selected, and executes the appropriate action to mark the content item being rendered as being of interest.

The invention claimed is:

1. A method to enhance rendering of a content item, the method comprising:
receiving, at a server system, a portion of the content item that can be played by a client system from the client system, the received portion of the content item being distinct from an identifier associated with the content item, the content item comprising audio and/or video content, the portion of the content item is not accompanied by an identifier suitable for interrogating a database to determine further information associated with the content item;
processing, at the server system, the received portion of the content item to determine, from the received portion of the content item, the identifier associated with the content item suitable for interrogating a database to determine further information associated with the content item, the processing comprising computing a hash value for the received portion of the content item, the determined identifier comprising the computed hash value;
obtaining further information on the content item using the determined identifier, the obtaining comprising searching the database using the computed hash value; and
transmitting the further information to the client system.

2. The method of claim 1, wherein the processing of the received portion of the content item is further to calculate a hash value for the portion of the content item.

3. The method of claim 2, wherein the obtaining of the further information includes utilizing the calculated hash value as the identifier for associated with the content item.

4. The method of claim 3, further comprising utilizing the identifier for the content item to add the content item to a list for future reference by a user.

5. The method of claim 1, wherein the further information includes a title associated with the content item.

6. The method of claim 1, wherein the portion of the content item is received from a mobile phone.

7. The method of claim 1, wherein a portion of the further information includes an offer to sell a further content item related to the content item.

8. The method of claim 1, wherein the processing of the received portion of the content item comprises determining audio characteristics associated with the received portion of the content item.

9. The method of claim 1, wherein the portion of the content item is a song.

10. The method of claim 9, wherein the server system maintains a database to store information associated with content items.

11. The method of claim 1, wherein the portion of the content item comprises video content.

12. A server system to facilitate enhanced rendering of a content item, the system comprising:
a receiver to receive a portion of the content item that can be played by a client system from the client system, the received portion of the content item is not accompanied by an identifier suitable for interrogating a database to determine further information associated with the content item, the content item comprising audio and/or video content;
a processor to
process the received portion of the content to determine, from the received portion of the content item, the identifier associated with the content item suitable for interrogating a database to determine further information associated with the content item, the processing comprising computing a hash value for the received portion of the content item, the determined identifier comprising the computed hash value; and a lookup component to obtain further information on the content item using the determined identifier and to transmit the further information to the client system, the obtaining comprising searching the database using the computed hash value.

13. The server system of claim 12, wherein the processor is arranged to compute a hash value for the received portion of the content item.

14. The system of claim 13, wherein the lookup module to utilize the calculated hash value as the identifier associated with the content item.

15. The system of claim 14, further comprising a listing module to add the identifier associated with the content item to a list for future reference by a user.

16. The system of claim 12, wherein the further information includes a title associated with the content item.

17. The system of claim 12, wherein the client system is a mobile phone.

18. The system of claim 12, wherein a portion of the further information includes an offer to sell a further content item related to the content item.

19. The system of claim 12, wherein the characteristic feature of the portion are audio characteristics.

20. A method to facilitate an e-commerce transaction, the method comprising:

receiving, at a server system, a media object that can be played by a client system, the media object being distinct from an identifier for the media object, the media object is not accompanied by an identifier suitable for interrogating a database to determine further information associated with the media object;

calculating a hash for the received media object;

processing, at a server system, the media object to determine the identifier for the media object, the identifier being suitable for interrogating a database to determine further information associated with the media object, utilizing the calculated hash value; and transmitting an electronic offer to sell in response to the receiving of the media object utilizing the determined identifier.

21. The method of claim 11, wherein the media object comprises a portion of an electronic content item.

22. A storage device having stored thereon data representing sets of instructions which, when executed by a machine, cause the machine to:

receive, at a server system, a portion of the content item that can be played by a client system from the client system, the received portion of the content item being distinct from an identifier associated with the content item a portion of the content item from a client system, the content item comprising audio and/or video content, the portion of the content item is not accompanied by an identifier suitable for interrogating a database to determine further information associated with the content item;

process, at a server system, the received portion of the content to determine, from the received portion of the content item, the identifier associated with the content item, the identifier being suitable for interrogating a database to determine further information associated with the content item, the obtaining comprising searching the database using the computed hash value; and obtain further information on the content item using the determined identifier, the obtaining comprising searching the database using the computed hash value.

23. A method to enhance rendering of a content item, the method comprising:

detecting an indication of a user interest in a content item that can be played by a client system;

responding to the indication by obtaining a portion of the content item from the client system, the portion of the content item being distinct from an identifier associated with the content item, the portion of the content item is not accompanied by an identifier suitable for interrogating a database to determine further information associated with the content item;

processing the portion of the content item to determine, from the received portion of the content item, the identifier associated with the content item, the obtaining comprising searching the database using the computed hash value;

obtaining further information associated with the content item utilizing the determined identifier, the identifier being suitable for interrogating a database to determine further information associated with the content item, the obtaining comprising searching the database using the computed hash value; and transmitting the further information to the client system.

* * * * *

UNITED STATES PATENT AND TRADEMARK OFFICE
CERTIFICATE OF CORRECTION

| | | |
|---|---|---|
| PATENT NO. | : 7,904,503 B2 | Page 1 of 1 |
| APPLICATION NO. | : 09/933845 | |
| DATED | : March 8, 2011 | |
| INVENTOR(S) | : Bartel M. Van De Sluis | |

It is certified that error appears in the above-identified patent and that said Letters Patent is hereby corrected as shown below:

On the Title page, in item [54], in "Title", in column 1, line 1, and in Specification, column 1, line 1, after "OF" insert -- A --.

On Title page 4, item [56] under "Other Publications", in column 2, line 19, before "Seventh" delete "the".

On Title page 4, item [56] under "Other Publications", in column 2, line 42, delete "Cormputer" and insert -- Computer --, therefor.

On Title page 5, item [56] under "Other Publications", in column 1, line 54, delete "Retrival"," and insert -- Retrieval", --, therefor.

In column 8, line 57, delete "messenging" and insert -- messaging --, therefor.

In column 10, line 33, in Claim 3, after "identifier" delete "for".

In column 11, line 47, in Claim 21, delete "claim 11," and insert -- claim 20, --, therefor.

Signed and Sealed this
Twenty-fourth Day of July, 2012

David J. Kappos
*Director of the United States Patent and Trademark Office*